UNITED STATES PATENT OFFICE.

CHARLES M. ELY, OF LEXINGTON, KENTUCKY, ASSIGNOR TO WILLIAM CASSIUS GOODLOE, OF SAME PLACE.

COMPOUND FOR HARNESS-OIL.

SPECIFICATION forming part of Letters Patent No. 327,871, dated October 6, 1885.

Application filed January 26, 1885. Serial No. 154,049. (No specimens.)

*To all whom it may concern:*

Be it known that I, CHARLES M. ELY, of Lexington, county of Fayette, and State of Kentucky, have invented certain Improvements in Compounds for Harness-Oil, of which the following is a specification.

The object of my invention is to produce a compound for rendering harness supple and soft, for giving it a neat appearance, and for preserving the leather of which it is made by rendering it impervious to water.

My said compound is made up of the following ingredients, in the proportions and by the process hereinafter specified in connection therewith, to wit: one gallon of paraffine-oil, one quart of neat's-foot oil, one pint of dissolved gum, one and one-half ounce of gum-arabic, dissolved, one pint of raw linseed-oil, and one and one-half pound of ivory-black or ivory drop-black, the whole compound to be well mixed together and heated gradually until it shall come to a boil, and then be boiled for ten minutes, and then be allowed to cool, when it will be ready for use, or to be bottled or canned.

What I claim as my invention, and desire to secure by Letters Patent, is—

The described compound for harness-oil, composed of one gallon of paraffine-oil, one quart of neat's-foot oil, one pint of dissolved gum, one and one-half ounce of gum-arabic, dissolved, one pint of raw linseed-oil, one-half pound of ivory-black, substantially as set forth.

CHARLES M. ELY.

Witnesses:
D. G. FALCONER,
J. H. WEBSTER.